United States Patent
Shaw et al.

(10) Patent No.: US 10,080,043 B2
(45) Date of Patent: *Sep. 18, 2018

(54) MODIFYING MEDIA ASSET METADATA TO INCLUDE IDENTIFICATION OF KEY MOMENT

(71) Applicant: PIKSEL, INC., Wilmington, DE (US)

(72) Inventors: Philip Antony Shaw, York (GB); Ralf Wilhelm Tillmann, Mannheim (DE)

(73) Assignee: PIKSEL, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/119,083

(22) PCT Filed: Feb. 13, 2015

(86) PCT No.: PCT/EP2015/053156
§ 371 (c)(1),
(2) Date: Aug. 15, 2016

(87) PCT Pub. No.: WO2015/121448
PCT Pub. Date: Aug. 20, 2015

(65) Prior Publication Data
US 2016/0360247 A1 Dec. 8, 2016

Related U.S. Application Data

(63) Continuation of application No. 14/179,704, filed on Feb. 13, 2014, now Pat. No. 9,510,030.

(51) Int. Cl.
*H04N 21/2343* (2011.01)
*H04N 21/439* (2011.01)
(Continued)

(52) U.S. Cl.
CPC ..... *H04N 21/23439* (2013.01); *G06F 3/0482* (2013.01); *G06F 17/30029* (2013.01);
(Continued)

(58) Field of Classification Search
CPC ......... H04N 21/23439; H04N 21/4394; H04N 21/25435; H04N 21/4755; H04N 1/00408;
(Continued)

(56) References Cited

U.S. PATENT DOCUMENTS

2002/0111852 A1 * 8/2002 Levine ................. G06Q 30/02
705/14.53
2003/0226151 A1 12/2003 Hamada et al.
(Continued)

FOREIGN PATENT DOCUMENTS

| EP | 1 804 510 A1 | 4/2007 | |
|---|---|---|---|
| GB | 2455331 | * 6/2009 | ............. H04N 71/73 |
| GB | 2 455 331 B | 6/2012 | |

OTHER PUBLICATIONS

International Search Report and Written Opinion, dated Apr. 14, 2015, EPO.

*Primary Examiner* — Hoang Vu A Nguyen Ba
(74) *Attorney, Agent, or Firm* — Holzer Patel Drennan

(57) ABSTRACT

In the following, a content delivery system delivers a modified version of a media asset to a current content consuming user. Control information identifying a desired attribute of the modified version of the asset is received from the current content consuming user. The media asset is modified based on the control information and audience reaction data associated with the media asset and generated by analyzing at least a previous content consuming user's reactions to the media asset while the media asset was supplied to a media output device of the previous content consuming user.

18 Claims, 6 Drawing Sheets

(51) Int. Cl.
| | | |
|---|---|---|
| H04H 60/73 | (2008.01) | |
| H04H 60/46 | (2008.01) | |
| H04H 60/33 | (2008.01) | |
| H04L 12/26 | (2006.01) | |
| G06F 17/30 | (2006.01) | |
| G06F 3/0482 | (2013.01) | |
| H04N 21/2543 | (2011.01) | |
| H04N 21/475 | (2011.01) | |
| H04N 21/45 | (2011.01) | |
| H04N 1/00 | (2006.01) | |
| H04N 21/472 | (2011.01) | |
| H04N 21/482 | (2011.01) | |
| G06K 9/00 | (2006.01) | |
| G06K 15/00 | (2006.01) | |
| H04N 21/44 | (2011.01) | |
| H04N 21/235 | (2011.01) | |
| H04N 21/262 | (2011.01) | |
| H04N 21/442 | (2011.01) | |
| H04N 21/8549 | (2011.01) | |
| H04N 21/6587 | (2011.01) | |
| H04N 21/25 | (2011.01) | |
| H04N 21/258 | (2011.01) | |
| H04N 21/4402 | (2011.01) | |

(52) U.S. Cl.
CPC .. *G06F 17/30038* (2013.01); *G06F 17/30265* (2013.01); *G06F 17/30386* (2013.01); *G06K 9/00751* (2013.01); *G06K 15/402* (2013.01); *H04H 60/33* (2013.01); *H04H 60/46* (2013.01); *H04H 60/73* (2013.01); *H04L 43/028* (2013.01); *H04N 1/00408* (2013.01); *H04N 1/00413* (2013.01); *H04N 21/2353* (2013.01); *H04N 21/251* (2013.01); *H04N 21/25435* (2013.01); *H04N 21/25891* (2013.01); *H04N 21/26233* (2013.01); *H04N 21/4394* (2013.01); *H04N 21/44008* (2013.01); *H04N 21/44204* (2013.01); *H04N 21/44218* (2013.01); *H04N 21/44222* (2013.01); *H04N 21/4532* (2013.01); *H04N 21/472* (2013.01); *H04N 21/4755* (2013.01); *H04N 21/47202* (2013.01); *H04N 21/482* (2013.01); *H04N 21/6587* (2013.01); *H04N 21/8549* (2013.01); *H04N 21/440281* (2013.01)

(58) Field of Classification Search
CPC ......... H04N 1/00413; H04N 21/47202; H04N 21/482; H04N 21/472; H04N 21/44008; H04N 21/2353; H04N 21/26233; H04N 21/44204; H04N 21/6587; H04N 21/8549; H04H 60/73; H04H 60/46; H04H 60/33; H04L 43/028; G06F 17/30265; G06F 17/30038; G06F 17/30029; G06F 17/30386; G06F 3/0482; G06K 9/00751; G06K 15/402

See application file for complete search history.

(56) References Cited

U.S. PATENT DOCUMENTS

| | | |
|---|---|---|
| 2005/0038877 A1 | 2/2005 | Gupta et al. |
| 2009/0022472 A1* | 1/2009 | Bronstein .......... G06K 9/00751 386/278 |
| 2010/0251295 A1 | 9/2010 | Amento et al. |
| 2011/0218997 A1* | 9/2011 | Boiman ................ G11B 27/28 707/737 |

* cited by examiner

MODIFYING MEDIA ASSET METADATA TO INCLUDE IDENTIFICATION OF KEY MOMENT

TECHNICAL FIELD

The present invention relates to delivering media content to an output device.

BACKGROUND

An ever-increasing quantity of media content is being produced that can be viewed by a content consuming user (content consumer) on a viewing device, such as a television ("TV") or similar. Moreover, a wide range of mechanisms are now available for delivering such content in addition to 'traditional' delivery mechanisms such as delivery via a broadcast channel to a television. These include on-demand delivery to computer devices such as smart-TVs, set-top boxes, smartphone or tablet devices, desktop computers, laptop computers etc. whereby a content consumer can stream media content (for online consumption) or download media content (for offline consumption) from a server over a network, such as the Internet or a cable TV network, at a time of their choosing. This includes recently broadcast content provided by a broadcaster of that content as part of a catch-up service, and historic or original (i.e. non-broadcast) content provided by a service provider as part of other on-demand services. On-demand services are accessed by a user using a user device on which is executed suitable software on such as a web-browser, media streaming or download application (or "app") e.g. provided by the broadcaster or service provider, or embedded software e.g. embedded in a set-top box provided by an operator of a cable TV network.

The proliferation not only of media content but also of the delivery mechanisms by which a user can opt to consume that content mean that, at any given time, there will likely be more media content available to a user which is at least of some interest to them than they can realistically hope to consume.

SUMMARY

The inventors have appreciated that there are a variety of situations in which a user, whilst having some interest in certain media content, is unable or unwilling to consume that content in its original form. An aim of the present invention is to modify such content within confines specified by the user whilst still retaining the inherent value that content had to the user in the first place.

According to a first aspect of the present disclosure, there is provided a content delivery system for delivering media content to a current content consuming user, the system comprising: an input configured to receive from the current content consuming user selection information for selecting a media asset for delivery to a media output device of the current content consuming user and control information identifying a desired attribute of a modified version of the asset; computer storage configured to store the media asset and asset metadata associated with the media asset; a modified version generation component configured to identify the selected media asset in the computer storage and modify the media asset based on the control information and the asset metadata; and a content delivery component configured to supply the modified version of the media asset to the media output device of the current content consuming user, the modified version exhibiting the desired attribute.

As an example, the inventors have recognized there are a wide variety of situations in which a user is unable or unwilling to dedicate the time required to consume the entire asset in real-time. Here "real-time" content consumption means the entirety of that asset or content is played out over its full duration as intended by a creator of that content. For instance, wherever viewers consume long-form video content (be it TV shows, movies or online video etc.) there can often be a need to watch, catch-up, recap or review that content quicker than real-time. In each of these cases, expanded below, there's a video play activity with an overlaid time constraint.

In this case, the desired attribute may be a timing condition selected by the user, and the modified version of the selected content may be generated to have a duration which is limited that time condition.

In U.S. application Ser. No. 14/170,704 in the name of the present applicants, the modified version of the content is based on audience reaction data which was generated by analysing at least at previous content consuming user's reaction to the media asset whilst the media asset was supplied to a media output device of the previous content consuming user. While that approach is advantageous, there is a similarly advantageous approach in the use of asset metadata which identifies a popular point in the asset by means other than audience reaction data. For example, the metadata could be derived by analysing what is said or shown in the asset and comparing it with expected audio or video items. For example, if the asset is a recording of a church service, there are likely to be key moments in the church service which are expected (for example, using certain words), and these can be automatically identified and associated with the asset as asset metadata. The asset metadata can then be used to modify the selected content when for example, time is constrained to deliver a modified version of the asset with key moments.

The metadata can also be used to mark the beginning and end of a scene, where such a scene is a popular point or key moment.

In embodiments, said modification of the media asset by the modified version generator may comprise editing the media asset based on the metadata to reduce the duration of the media asset. The desired attribute may be a timing constraint, and the media asset may be edited based on the timing constraint and the metadata such that the modified version of the media asset has a duration limited by the timing constraint.

The edited version of the media asset may comprise at least one portion of the media asset identified a key moment and omit at least one other portion of the media asset.

The selection information may be for selecting part of the media asset and the desired attribute is a desired attribute of a modified version of that part of the media asset, and the modified version generation component may be configured to modify the selected part of the media asset based on the control information and the metadata, the modified version being a modified version of the selected part of the media asset.

The media asset may be a video asset. The output device of the current content consuming user may be a display screen.

The content delivery component may be a network interface configured to supply the modified version of the media asset to the media output device of the current content consuming user via a computer network. The modified version may be supplied as a stream or download via the network.

The modified version generation component may be configured to generate based on the control information and the metadata media asset modification data and the modified version of the media asset is generated dynamically, based on the generated modification data, as it is supplied to the media output device of the current content consuming user. The modified version of the media asset may be generated dynamically responsive to one or more received modification requests, said requests having been instigated based on the generated modification data. Said requests may be instigated manually by the user. Alternatively, said requests may be instigated automatically in response to (that is, upon) reaching a point in the media asset identified as the end of a key portion to skip to a point in the media asset identified as the start of a new key portion by the metadata.

According to a second aspect of the present disclosure, there is provided a content delivery method for delivering media content to a current content consuming user, the method comprising: receiving from the current content consuming user selection information for selecting a media asset for delivery to a media output device of the current content consuming user and control information identifying a desired attribute of a modified version of the asset; accessing computer storage to identify the selected media asset, the computer storage configured to store the media asset and asset metadata associated with the media asset; modifying the media asset based on the control information and the asset metadata; and supplying the modified version of the media asset to the media output device of the current content consuming user, the modified version exhibiting the desired attribute.

According to a third aspect of the present disclosure, there is provided at least one computer readable medium storing executable program code configured, when executed, to cause operations of: receiving, from the current content consuming user, selection information for selecting a media asset for delivery to a media output device of the current content consuming user and control information identifying a desired attribute of a modified version of the asset; accessing computer storage to identify the selected media asset, the computer storage configured to store the media asset and asset metadata associated with the media asset; modifying the media asset based on the control information and the asset meta data; and supplying the modified version of the media asset to the media output device of the current content consuming user, the modified version exhibiting the desired attribute.

According to a fourth aspect, there is provided a computer device for delivering media content to a current content consuming user, the computer device comprising: an input configured to receive from the current content consuming user selection information for selecting a media asset for delivery to a media output device of the current content consuming user and control information identifying a desired attribute of a modified version of the asset; an access component for accessing computer storage storing the media asset and asset metadata associated with the media asset; a modified version generation component configured to identify the selected media asset in the computer storage and modify the media asset based on the control information and the asset metadata; and a content delivery component configured to supply the modified version of the media asset to the media output device of the current content consuming user, the modified version exhibiting the desired attribute.

The computer device may be a user device or a server.

According to a fifth aspect, there is provided a content delivery system for delivering media content to a current content consuming user, the system comprising: an input configured to receive selection information for selecting a media asset for delivery to a media output device of the current content consuming user; computer storage configured to store the media asset; a key moment identification component configured to identify that at least one portion of the selected media asset is a key moment and to associate metadata with the media asset identifying the key moment portion; an extraction component configured to access the computer storage to identify the selected media asset and extract the identified portion of the media asset; and a content delivery component configured to supply the extracted portion of the media asset to the media output device of the current content consuming user.

The media asset may be extracted responsive to a user input from the current consuming user, or automatically.

The user input may be a skip request received during a current delivery of the media asset to the media output device of the current content consuming user by the content delivery component, responsive to which the content delivery component may be configured to skip the current delivery to the key moment of by supplying the extracted portion of the media asset to the media output device of the current content consuming user.

The skip request may instigated manually by the current content consumer.

Alternatively, the skip request may be instigated automatically responsive to the current delivery reaching a point in the media asset which is not a key moment.

The key moment identification component may be configured to identify that a plurality of portions of the media asset are key moments, and the extraction component is configured to selectively extract one or more of said portions. The user input may comprise a timing constraint and the extraction component may be configured to select the one or more portions based on the timing constraint and extract those selected portions.

BRIEF DESCRIPTION OF FIGURES

For a better understanding of the present invention and to show how the same may be carried into effect, reference will now be made by way of example only to the following drawings in which.

DESCRIPTION OF EMBODIMENTS

Figure 1:
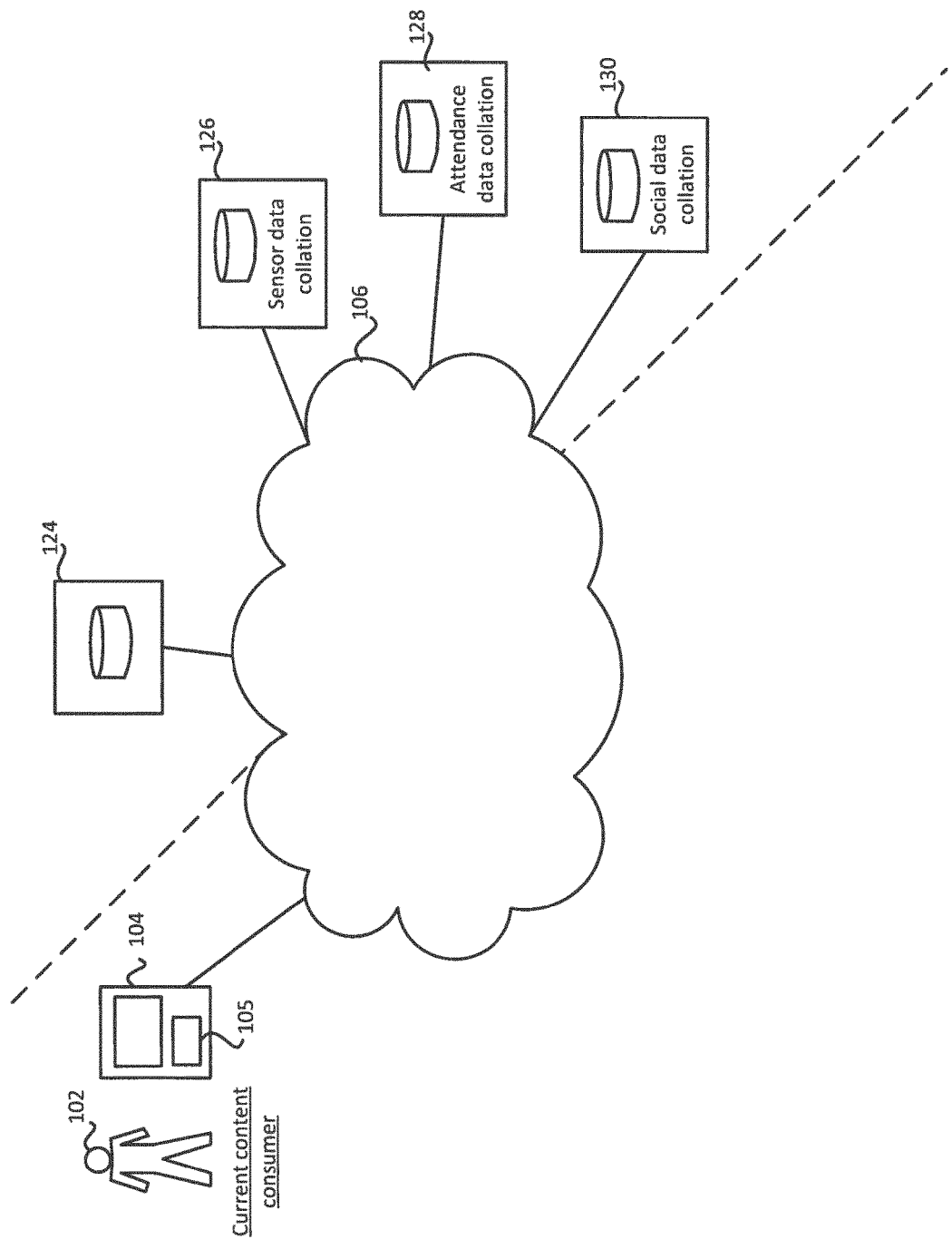
FIG. 1 is a schematic block diagram of various devices for use in delivering modified content to a user, and their associated users where applicable.

FIG. 1 shows a current content consuming user 102 (current content consumer) operating a first user device 104 capable of connecting to a computer network 106. The user device is a computer device in the form of, for example, a smartphone device, tablet computing device, personal computer ("PC"), smart-TV, set-top box, games console etc. The computer network is a packet-based network such as the Internet in this embodiment but may not be packet-based in other embodiments. The network connection can be wired such as Ethernet or wireless (either WiFi or GSM), or any suitable interface which allows the user device 102 to communicate with the network 106. Connected to the network 106 is a content providing server 124 which stores media content and associated data. The media content is stored in the form of a collection of media assets (that is, individual pieces of media content), each media asset being, for example, an episode of a television show, a movie, a recording of a sports event (e.g. football match) or other event such as a church service, etc.

The user device 104 executes a media application 105 which enables the user device 104 to communicate with the content providing server 124 via the network 106. Using the media application 105, the user 102 can select media content stored at the server 124 and the selected media content is supplied to the user device 104 via the network 106 for delivery to by the current content consumer 102 e.g. as a stream or download.

Figure 3:
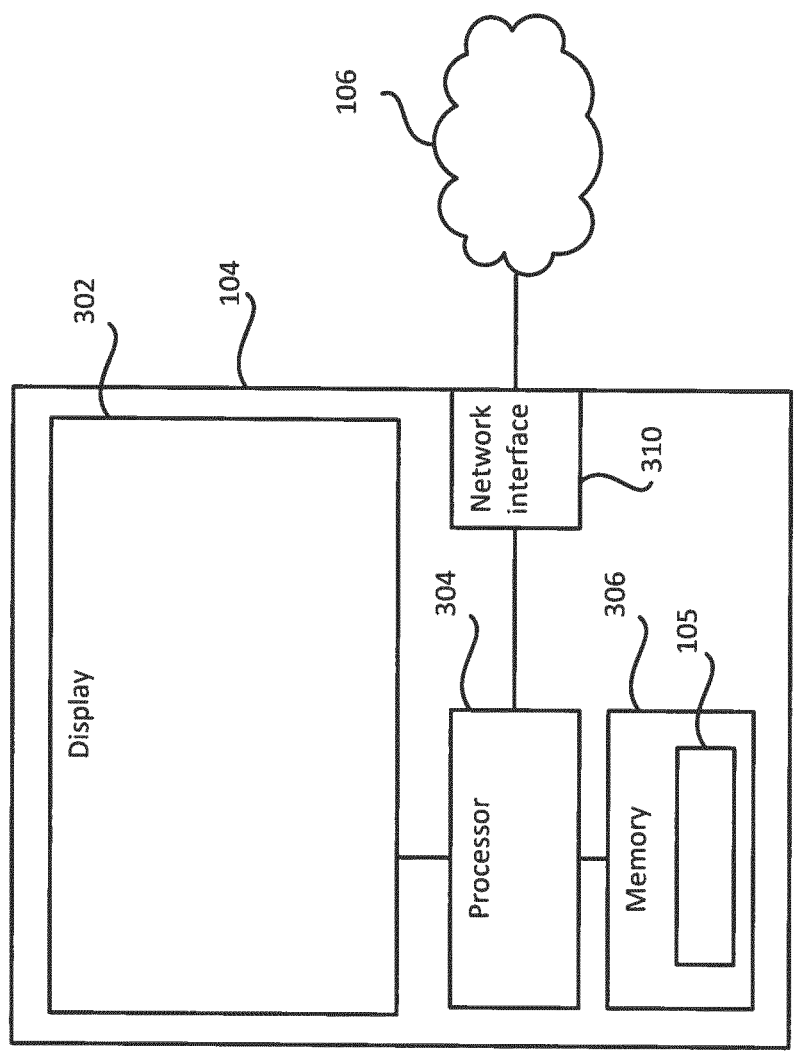
FIG. 3 is a schematic block diagram of a user device comprising a media output device in the form of a display.

Further details of the user device 124 are shown in FIG. 3 which is a schematic block diagram of the user device 124. As shown in FIG. 3, the user device 104 comprises a network interface 310 for connecting to the network 106, a processor 304 in the form of one or more Central Processing Units ("CPUs"), a memory (computer storage) 306, and a media output device in the form of a screen 302. The memory 306 is connected to the processor 304 and stores software in the form of program code for execution on the processor 304 which includes operating system code for managing hardware resources of the user device 104 and applications which cause the user device 104 to perform useful tasks above and beyond the mere running of the user device itself. The applications include the media application 308. The processor 304 is connected to the screen 302 to allow the screen to display media content and other information to the user 102. The processor is connected to the network interface 310 to allow data to be transmitted to and received from the network 106, which includes the receipt of media content for display on the screen 302 and the transmission of requests for such content. The screen is a touchscreen configured to also receive inputs from the user 102 and is thus also an input device of the user device 104. In alternative user devices the screen may not be a touch screen and/or the user device may comprise alternative input devices such as a keyboard, mouse, television remote control, camera or infra-red depth sensor able to detect gesture commands, biometric sensor(s) etc. The screen, network interface and memory are integrated into the user device 104. In alternative user devices, one or more of these components may not be integrated and may be connected to the processor via a suitable external interface (e.g. cabled interface such as USB or wireless interface such as Bluetooth or other wireless interface). For instance, the screen may be an external screen connected to the processor via a SCART, RCA or other similar interface.

The media application 105 has a user interface for presenting information to the user via one or more output devices of the user device 104 and to receive information from the user via one or more input devices of the user device 104. In particular, the user interface controls the display 302 to present visual information to the user 102.

Figure 2:
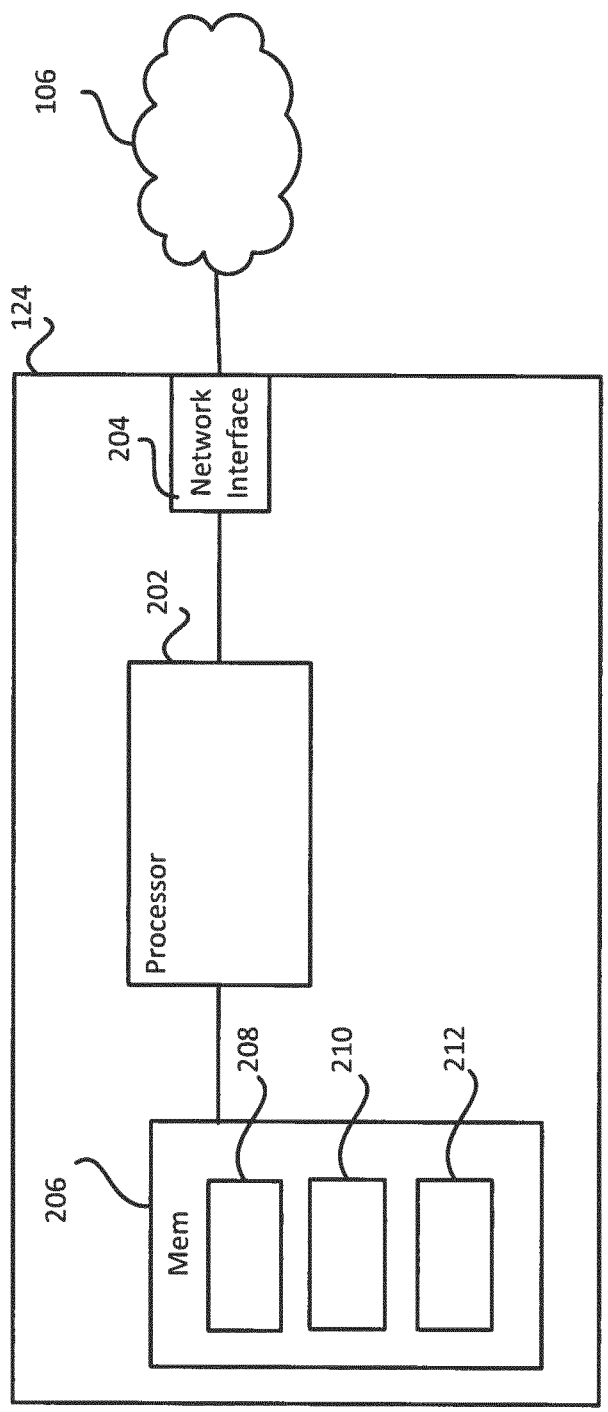
FIG. 2 is a schematic block diagram of a content providing server.

Further details of the content providing server are shown in FIG. 2 which is a block diagram of the server 124. The server 124 comprises a processor 202 in the form of one or more CPUs, a network interface 204, and computer storage 206. The computer storage 206 is connected to the processor 202 and holds both code for execution on the processor and data. The data includes one or more media assets 210 and respective asset metadata 212 associated with those assets. It will be understood that the assets themselves may not be stored, but instead asset identifiers allowing assets to be retrieved from the server 124 in order to be modified. The code includes content provider code 208 for providing media content of those media assets to users as requested thereby. The processor is connected to the network interface 204 to allow data to be transmitted to and received from the network 106 by the server 124. This includes receipt of requests for media content from the user device 104 and transmission of the requested media content to the user device 104.

Asset metadata marks key moments in the asset and can be generated manually by a maker of the asset or automatically by analysing the asset.

Also connected to the network 106 are a sensor data server 126, an attendance data server 128, and a social data collection server 130. The servers 126, 128 and 130 collect and collate various audience reaction data pertaining to one or more previous deliveries of the stored assets to one or more previous content consuming users (previous content consumers, referred to collectively as "an audience") and supply the collated audience reaction data to the content providing server 124. This audience reaction data can be used with the metadata to modify the asset, and is described more fully in U.S. application Ser. No. 14/179,704 incorporated herein by reference.

An item of media content—equivalently referred to as a "media asset"—(or a series of such items), can be analysed by monitoring its video or audio data to identify key moments.

Once identified, asset metadata can be used, among other things, for the following:
  to determine which segments of media content are interesting to a particular users;
  to compare segments to one another in terms of relative appeal;
  to determine what a particular segment is about to decide whether or not a given clip is what a user wants.

The disclosure considers a process which automatically creates a particular digest of content—referred to as a "summarisation engine"—wherein asset metadata is considered as an input to the process which allow the process to create a modified version of a media asset in the form of an edited version of that media asset.

A media asset can be edited to provide a compressed (i.e. reduced-duration and reduced-content) media asset or "summary" containing only those segments, e.g. marked as a key moment by the metadata.

The edited version of the media asset comprises one or more portions of the media asset identified as key moments and does not comprise (i.e. omits) other portions of the media asset.

A method of delivering content to a current content consuming user will now be described with reference to FIG. 4. In embodiments, the method is implemented at the content delivery server 124 and FIG. 4 is a functional block diagram of a part of the server 124

Figure 4:
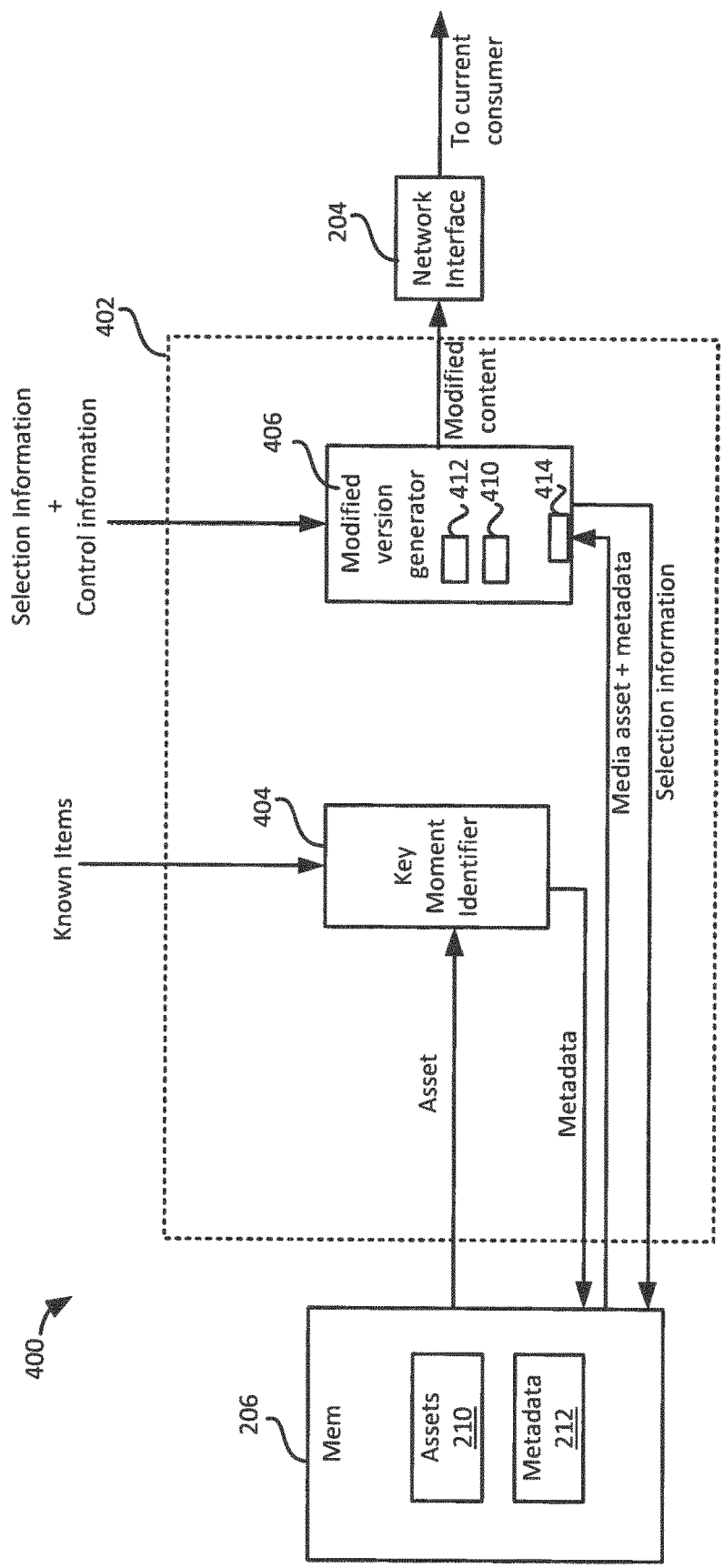
FIG. 4 is a functional block diagram of a content delivery system.

FIG. 4 shows a content delivery system 400 for delivering modified content to a current content consumer. The system 400 is implemented by the content providing server 124 and comprises a modification component 402 implementing the summarization engine. The component 402 represents the functionality implemented by executing the content provider code 208 on the processor 202 of the server 124. As shown in FIG. 4, the content delivery system 400 comprises the computer storage 206, the network interface 204 and the modification component 402. The modification component 402 comprises a key moment identification component 404 and a modified version generation component 406. The modified version generation component 406 has an input connected to receive control information and selection information, and an input connected to receive media content in the form of media data from the computer storage 206, with its asset metadata. The modified version generation component 406 also has a first output connected to supply selection information to the computer storage 206 and a second output connected to supply media content in the form of media data to the network interface 204. The key moment identification component has an input to receive known items of interest and an input to receive assets to be analysed to compare video or audio data of the asset with the known item of interest to generate asset metadata to store with the asset.

The selection information identifies one or more selected media assets (or parts thereof) selected by the current content consumer 102. The control information identifies a desired attribute (that is, desired by the current content consuming user) of a modified version of the identified one or more media assets (or parts thereof), for instance a timing constraint.

The modified version generation component 406 generates the modified version of the selected media asset(s) (or parts thereof) based on the asset metadata and the control information. The modified version is generated not only to exhibit the desired attribute but also in a manner to show key moments and omit uninteresting or less interesting parts.

The modified version generation component comprises an access component 414 for accessing the computer storage 206, a metadata detection component 410 for identifying one or more key moments of the media asset (described below), and an extraction component 412 for extracting portions of the media asset at those key moments (described below).

The disclosure considers the following scenarios in which it would be beneficial to modify an asset to generate a modified version of that asset, in particular a compressed asset having a duration limited by a user-specified time-constraint.

1. Impatient Viewer

People do not always have time to watch the full movie, episode of their favourite TV show or the latest football match. These viewers want to see the edited highlights of their content in the time available. While this could be solved by the content owner creating a custom clip reel for each piece of content this rigid approach suffers in that:
  it does not address the needs of different sets of users who may want to condense content into different time spans (Ben has 10 mins to watch the best bits of a movie; Joe has 30 mins etc. . . . )
  the staffing overhead involved in creating condensed content manually, particularly if you own a large catalogue of media, can be significant.

In this instance, the problem is one of compressing a media asset (such as a film, episode, or recording of a sports event) into a given timeframe for a particular viewer without significant editorial effort.

2. Catch-Up

Viewers hear about a great new TV show that everyone is talking about but they've missed the first few episodes and the next one is on soon. It would be desirable for them to be able to catch up with the story lines so they can start watching the next episode the moment it's shown. Currently, such users may simply avoid watching any subsequent episodes until the whole thing is released on catch-up by which time they've either forgotten about it or gone off the idea.

Here there is a similar time constraint as #1 above as well as the need to create a digest of content for easy, quick consumption. A difference here is the content may be content be content of a plurality of media assets e.g. if it spans more than one episode of a TV series.

3. Recap

The viewer may have started to watch a movie or a season of TV shows but for some reason took a break. For example, they're now about to start watching the season on-demand from where they left off but they want to remind themselves about what had happened up to that point, or they're resuming the movie but can't quite recall what the highlights were.

In this case, the viewer wants a quick way to recap the content they already watched to get them ready to pick the show, movie or game back up again. There's a similar time constraint; a potential need to condense multiple and indeed partial media assets; and benefit derived from a personalised set of highlights.

The method according to a first embodiment will now be described. In this method, the desired attribute is a timing constraint and a summary of selected media content is generated comprising only selective portions of that media content (other portions of the media content are omitted form the summary). Those selective portions are the portions marked as key moments by the metadata.

The media application 105 presents, via the user interface, one or more selection options for the user 102 to select media content (one or more assets, or parts thereof) that they wish to summarize. An example is illustrated in FIG. 5A. In this example, the application 105 presents via the application user interface a search field 702 into which the current content consuming user can input one or more search terms e.g. using the touch screen or voice recognition. Responsive to the current content consuming user selecting a search option 704, the input search terms are transmitted to the server 124 where they are processed to determine whether or not there are any media assets stored in memory 206 that match those search terms. For instance, the user 102 may enter one or more words which they believe to constitute a title of a movie or television show which are processed by the server 124 to see if that movie or television show is stored in memory 206. The sever 124 notifies the user device 104 if one or more matching media assets are found, responsive to which the media application 105 presents via the user interface one or more selectable options by which the current content consuming user can select some or all of the matching content (that is, some or all of the matching assets, or parts thereof) that they wish to summarize. An example is illustrated in FIG. 5B. In this example, the user's search has returned a plurality of episodes of a television show (each episode being stored as a respective media asset at the server 124). The user 102 can select which parts of the episode(s) they wish to summarize in this example by moving sliders 708 to encompass different temporal parts of the content—for instance, in FIG. 5B, the user has selected all of episode 2 and approximately one quarter of episode 1 to be summarized (to indicate that only portions of the media assets from those parts are to be included in the summary). This selection is transmitted to the server 124 responsive to the user selecting a summarization option 712 and received thereby as the control information of FIG. 3 in response, the modified version generator 406 identifies the selected media content in the memory 206 and retrieves it therefrom.

The application also presents a duration field into which the user 102 can input a desired duration for the summary (see below).

The metadata associated with the selected media content is processed to identify "key portions" of that media content. Here, "key portions" mean those portions of the media asset which were identified manually or by automated analysis as being of likely interest based on known items of general interest in particular events.

The requested duration is used by the summarisation engine to create a summary tailored to a specific user's needs. The modified version generator selects key moments in order of rank until the cumulative duration of the selected key moments substantially matches the desired summary duration. Key portions can be ranked during the analysis.

As an example, the current content consumer may wish to summarise this piece of content in 5 minutes and specify that duration to the summarization engine. The summarisation engine has identified six key moments with a total duration of 8 minutes. Since there is not enough time to show them all, the engine picks the highest ranking moments first until the addition of a further clip would exceed the user's requirement.

The summary (modified asset) is generated by concatenating key portions of the media asset identified by the selected key moments. Each key portion of the media asset is a respective portion of the media asset occurring at a respective corresponding selected key moment (i.e. each key portion is the respective portion of the media asset between the determined start and end times of the respective corresponding identified key moment relative to the reference point in the media asset e.g. the start of the media asset). Each is extracted from the media asset by the extraction component 412. The start and end times can be identified by the metadata.

The key portions are concatenated in the temporal order in which they occur in the original media content. The summary is delivered to the user device 104 either by streaming the summary thereto or by the user device 104 downloading the summary from the server 124 for offline consumption.

Note that references to "modifying an asset", to "generating a modified asset" and the like do not necessarily imply that media data separate from the media data of the original asset is generated and e.g. stored in memory alongside the original media asset.

Figure 5:
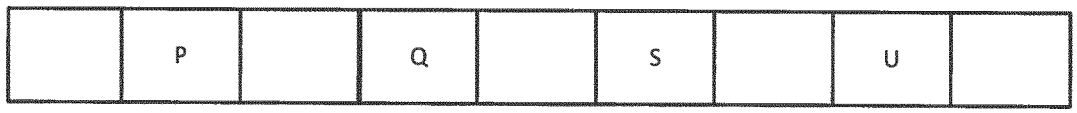
FIG. 5A is an exemplary illustration of an application user interface operating in a search mode.
FIG. 5B is an exemplary illustration of an application user interface operating in a selection mode.
FIG. 5C is an exemplary illustration of an application user interface operating in a playback mode.
Figure 5A:
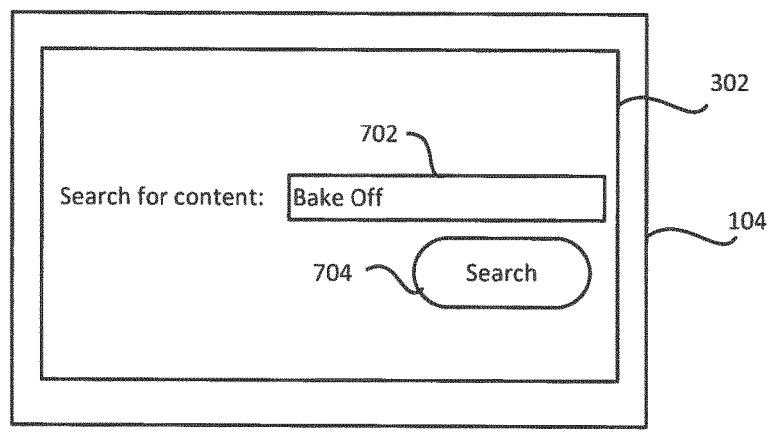
Figure 5B:
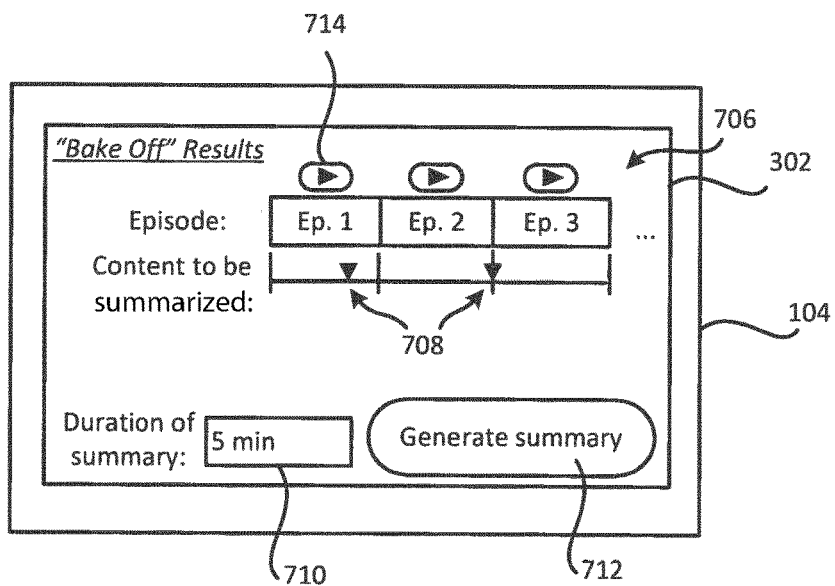

A modified version of a media asset can be created by generating media asset modification (meta)data in the form of a "skip track" which identifies, for instance, those portions of the media asset which should be skipped when the modified version thereof is delivered—e.g. to generate the summary containing key moments P, Q, S, U shown in FIG. 5, the modification can be effected by using metadata which specified that delivery of the selected content as a stream to the user 102 via the network 106 should commence at the start of P, skip to Q at the end of P (omitting intervening portions), skip to S at the end of Q (omitting intervening portions), skip to U at the end of S (omitting intervening portions), and terminate at the end of U. That is, the modified version of the media asset may be generated 'on-the-fly'

(dynamically) as the media asset is, say, streamed to the current consumer over the network 106 by skipping the delivery at the end of each key moment to the start of the next key moment identified by the skip track.

This is advantageous in many scenarios as it requires only minimal memory overhead to generate each modified version of the selected content (whereas significant memory overheads would be required to generate and store possibly numerous partial replicas of the original media content).

In embodiments, the skip track is transmitted to the user device 104 over the network 106 for use thereat. For instance, responsive to a download input from the current consumer, the application at the user device may download both the full, unmodified media asset and the skip track from the media server 124, and the downloaded media asset may then be delivered at the user device in dependence on the skip track and possibly based on a user input timing constraint in the manner described above e.g. to only deliver key portions of the media asset as identified by the skip track to the current consumer and/or only those key portions that have an overall duration less than that specified by the current consumer at the user device. For instance, the modified version may be generated and stored at the user device based on the unmodified version and the skip track as a separate media file, or the downloaded media asset may be modified 'on-the-fly' as the downloaded media asset is delivered (played-out) in order to deliver the modified version to the current consumer at the user device. That is, the application running on the user device may modify a media asset stored at the user device based on the control information received at the user device and the metadata (e.g. using the skip track stored at the user device).

As another example, the media asset may be streamed to the user device and the application 105 on the user device (or possibly a plugin to that application) may automatically instigate one or more modification requests in the form of skip request(s) to the server 124 over the network 106 based on the received skip track, responsive to which the media asset stream skips to the next key moment, relative to a current elapsed time of the stream, identified by the skip track in order to modify the asset, again, 'on-the-fly'. For instance, a skip request may be instigated automatically responsive to the application (or plugin) determining the stream has reached a point in the media asset which is not a key moment (that is a temporal point outside of a temporal interval identified as a key moment) in order to skip to the next key moment. These skip requests may be instigated in further dependence on the input timing constraint from the current content consuming user e.g. skip requests may be instigated in order to effect a delivery of only those key portions having a cumulative duration less than that desired by the user—for instance, to effect delivery only of portions P, Q, S and U, a first skip request effecting a skip to the start of P may be instigated, a second skip request may be instigated at the end of P to skip to the start of Q etc. until the end of U at which point a termination request may be instigated to terminate the delivery. Thus, the skip requests may be automatically instigated responsive to the stream reaching a point which is not a selected key moment (but which may or may not be a non-selected key moment).

Alternatively these skip requests may be instigated manually but in nonetheless in response to information and/or selectable options presented to the user via the user interface based on the received skip track (see below). That is, the modification may be effected at the user terminal and possibly the behest of the current content consuming user thereof.

The method according to a second embodiment will now be described. In this method, rather than the current content consumer pre-specifying desired attribute(s) for a modified version of selected media content, the current content consumer dynamically interacts with the media content as it is delivered to the device.

While watching an item of content, the current content consumer may wish to skip ahead to the next interesting scene or clip and skip over the intervening portion of material.

Figure 5C:
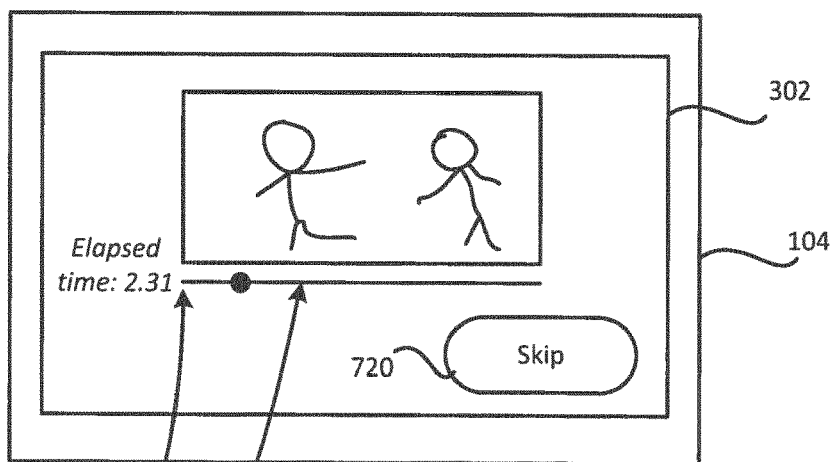

Compared to the preceding method, delivery (playback) of the (unmodified) selected media content to the user by the content delivery component commences e.g. that content is streamed to the current consumer 102 via the network 106. Playback is so commenced responsive to the user selecting a playback option (714 in FIG. 5B) displayed via the application user interface. Also in response to the user selection the option 712, the client user interface switches to a playback mode—illustrated in FIG. 5C—in which the streamed content is displayed.

The current consumer 102 instigates a skip request, requesting that the delivery skip to the next identified key moment of the selected media content. That request is instigated via the application user interface by the user 102 selecting a skip option 720, and is transmitted to the server over the network 106. In some embodiments, the skip track is transmitted to the user device (see above) and the skip option 720 is selectively displayed based on the received skip track e.g. the skip track may only be displayed if the skip track indicates that a current elapsed time of the media asset delivery is not a key moment, and may optionally be displayed in conjunction with a textual "overlay" on the video which informs the user that they might wish to consider skipping ahead by an amount of time (e.g. in minutes) that would take them to the next key moment identified by the skip track relative to the current elapsed time of the delivery (or the textual overlay may be displayed as an alternative to the selectable option 720).

Responsive thereto, the server 124 identifies the next key moment—that being the key moment after a current elapsed time of the stream and closest to the current elapsed time—and delivery of the media content skips to the start time of that key moment. That is, the server 124 commences streaming a portion of the content at the next key moment to the user by supplying extracting the portion of the media asset at the next key moment and supplying the extracted portion to the media output device of the current content consuming user via the network 106.

In each of the above-discussed scenarios, a user wants to consume video content quicker than real-time. The particular time constraint is specific to the user as are their interests—this means that even if a content owner wished to invest in the man-power to create such views manually, the sheer variety of parameters makes the task impractical.

Whilst in the above, the system 400 is implemented at the server 124, in alternative embodiments some or all of the system may be implemented at the user device 104. For instance, the user device may download and store an (original, unmodified) media asset, and the application on the user device may download (possibly pre-filtered) audience reaction data—or the aforementioned "skip track"—from the server 124 and modify the content based thereon (that is the application 105 running on the user device may be configured to implement some or all of the system 400 of FIG. 4 and the methods described above, although in this case the modified version is supplied to the screen of the user device directly and may not be supplied to the network 106). That is, the user device may access the metadata in computer storage of the network 106 (e.g. computer storage 206) remotely via the network 106.

Further, whilst in the above the functionality of server 124 is implemented by a single server, in alternative embodiments the same functionality may be implemented by more than one server. For instance, a first content server may comprise computer storage storing the media asset and the metadata, and a second content server may comprise an access component for accessing the computer storage at the first server remotely in order to modify the remote media asset.

Further, whilst in the above the desired attribute is a timing constraint, rather than (or in addition to) a time constraint, the user may select that they want to be shown only the most interesting portions of the media content. That is, the desired attribute may be a qualitative rather than quantitative condition. In the example above, the summarization engine may generate a summary containing all of the identified key moments P-U, the summary thus having a duration of about 8 minutes.

Further, whilst in the above the media asset is a video asset (comprising video data and possibly audio data), a media asset may alternatively be an audio asset (comprising audio data but not video data) e.g. an audio asset might be an episode of a radio show, or a music track, etc.

Further, whilst in the above a media asset is modified by editing the media asset, a media asset may be modified in one or more of a number of alternative or additional ways. For instance, a media asset may be modified by performing one or more of the following: dynamically editing, changing play rates, inserting CGI, inserting ads, controlling multiple time-synced feeds, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A content delivery system for delivering media content to a current content consuming user, the system comprising:
   a processor having an input configured to receive selection data information from the current content consuming user for selecting a media asset for delivery to a media output device of the current content consuming user; and
   a memory configured to store the media asset;
   wherein the processor is configured to:
   apply an analysis to the selected media asset to identify that at least one portion of the selected media asset is a key moment,
   apply a modification to metadata of the selected media asset to include an identity of a beginning and an end of the key moment;
   carry out an access to the memory in dependence on the modified metadata,
   carry out identification of the selected media asset, and
   carry out extraction of the key moment of the media asset from the memory; and
   the system further comprising a network interface, executed by the processor, to carry out transmission of the key moment extracted from the memory and to transmit that key moment to the media output device of the current content consuming user.

2. A content delivery system according to claim 1, wherein the portion is extracted responsive to a skip request received at the processor during a current transmission of the media asset to the media output device of the current content consuming user by the network interface, responsive to which the network interface is further configured to skip the current delivery to the key moment by transmitting the key moment to the media output device of the current content consuming user.

3. A content delivery system according to claim 2, wherein the skip request is instigated manually by the current content consuming user.

4. A content delivery system according to claim 2, wherein the skip request is instigated automatically by the processor responsive to the current delivery reaching a point in the media asset which is not a key moment.

5. A content delivery system according to claim 1, wherein the processor is configured to identify that a plurality of portions of the media asset are key moments, and to selectively extract one or more of said portions.

6. A content delivery system according to claim 5, wherein the processor is configured to select the one or more portions based on a received timing constraint data information and extract those selected portions.

7. A content delivery system according to claim 1, wherein the metadata can be modified manually by a maker of the media asset.

8. A content delivery system according to claim 1, wherein the metadata can be modified automatically by the processor by analysing the media asset.

9. A content delivery system according to claim 1, wherein the processor is operable to analyse one of video and audio data of the media asset and to compare the one of video and audio data with known desired data to identify the key moment.

10. A method for delivering media content to a current content consuming user, the method comprising:
    receiving, by a processor, selection data information from the current content consuming user for selecting a media asset for delivery to a media output device of the current content consuming user, with the media asset stored in a memory;
    applying, by the processor, an analysis to the selected media asset;
    identifying, by the processor, that at least one portion of the selected media asset is a key moment, and
    modifying, by the processor, metadata of the selected media asset to include an identity of a beginning and an end of the key moment, and wherein the asset metadata can be modified one of manually by a maker of the media asset and automatically by analysing the media asset;
    accessing the memory in dependence on the modified asset metadata to identify the selected media asset,
    extracting, by the processor, the key moment from the memory; and
    transmitting the extracted key moment to the media output device of the current content consuming user.

11. The method according to claim 10, wherein the portion is extracted responsive to a skip request received at the processor during a current transmission of the media asset to the media output device of the current content consuming user by a network interface, responsive to which the network interface is configured to skip the current delivery to the key moment by transmitting the key moment of the media asset to the media output device of the current content consuming user.

12. The method according to claim 11, wherein the skip request is instigated manually by the current content consuming user.

13. The method according to claim 11, wherein the skip request is instigated automatically by the processor responsive to the current delivery reaching a point in the media asset which is not a key moment.

14. The method according to claim 10, wherein the processor is configured to identify that a plurality of portions of the media asset are key moments, and to selectively extract one or more of the identified portions.

15. The method according to claim 14, wherein the processor is further configured to select the key moments based on a received timing constraint data information and extract those selected portions.

16. The method according to claim 10, wherein the metadata can be modified manually by a maker of the media asset.

17. The method according to claim 10, wherein the metadata can be modified automatically by the processor by analysing the media asset.

18. The method according to claim 10, wherein the processor is operable to analyse one or both of video and audio data of the media asset and to compare the one or both of video and audio data with known desired data to identify the key moment.

* * * * *